(12) United States Patent
Holopainen

(10) Patent No.: US 6,488,815 B2
(45) Date of Patent: Dec. 3, 2002

(54) ARRANGEMENT FOR LOADING A DEFLECTION COMPENSATED ROLL OR OTHER ELONGATED MEMBER IN A PAPER/BOARD OR FINISHING MACHINE AND FOR PROVIDING AN ARTICULATION BEARING ASSEMBLY

(75) Inventor: Kari Holopainen, Muurame (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/827,415

(22) Filed: Apr. 6, 2001

(65) Prior Publication Data

US 2002/0065179 A1 May 30, 2002

(30) Foreign Application Priority Data

Apr. 7, 2000 (FI) .................................................. 000828

(51) Int. Cl.⁷ .................................................. D21F 7/02
(52) U.S. Cl. ...................................... 162/272; 162/281
(58) Field of Search ........................ 100/162 R, 163 R, 100/162 B, 168, 170, 172, 47; 162/198, 199, 252, 253, 262, 263, 272, 358.1, 358.3, 361, 273, 281; 492/5, 6, 7, 20; 384/91, 99, 100, 114, 117, 118

(56) References Cited

U.S. PATENT DOCUMENTS

| | | | |
|---|---|---|---|
| 3,802,044 A | 4/1974 | Spillmann et al. | 29/113 AD |
| 4,181,378 A | * 1/1980 | Schmaeng | 308/361 |
| 5,273,626 A | * 12/1993 | Niskanen et al. | 162/361 |
| 6,012,386 A | * 1/2000 | Lahtinen et al. | 100/47 |
| 6,344,019 B1 | * 2/2002 | Kusters | 492/16 |

FOREIGN PATENT DOCUMENTS

| | | | |
|---|---|---|---|
| FI | 59655 | 5/1981 | |
| WO | WO 98/36185 | * 8/1998 | F16C/32/06 |

* cited by examiner

Primary Examiner—Steven P. Griffin
Assistant Examiner—Eric Hug
(74) Attorney, Agent, or Firm—Steinberg & Raskin, P.C.

(57) ABSTRACT

The invention relates to an arrangement for loading a deflection compensated roll (1) or other elongated member in a paper/board or finishing machine and for providing an articulation bearing assembly, the roll or elongated member being provided with a stationary support shaft (3) extending axially of the roll or the elongated member or with stub shafts present at the ends thereof, the support shaft ends or the stub shafts protruding from the roll or the elongated member and being mounted on a bearing block (9). The arrangement of the invention comprises at least one hydrostatic main loading element (4), which is mounted on the bearing block (9) and works on the support shaft (3) or the stub shafts of the roll (1) or other elongated member and which constitutes a loading element and, at the same time, an articulation bearing assembly for the roll or other elongated member.

14 Claims, 6 Drawing Sheets

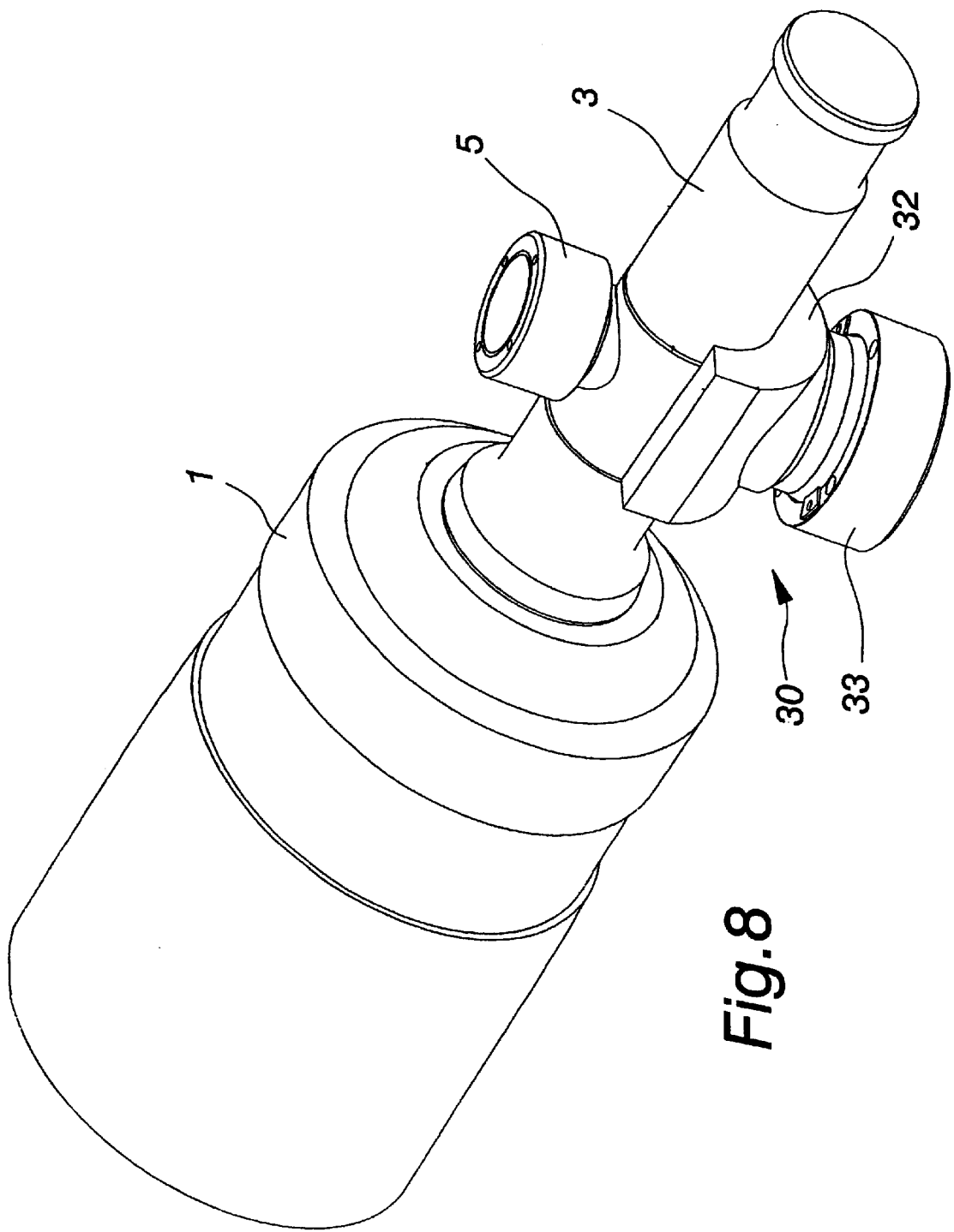

ARRANGEMENT FOR LOADING A DEFLECTION COMPENSATED ROLL OR OTHER ELONGATED MEMBER IN A PAPER/BOARD OR FINISHING MACHINE AND FOR PROVIDING AN ARTICULATION BEARING ASSEMBLY

FIELD OF THE INVENTION

The present invention relates to an arrangement for loading a deflection compensated roll or other elongated member in a paper/board or finishing machine and for providing an articulation bearing assembly, said roll or elongated member being provided with a stationary support shaft extending axially of the roll or the elongated member or with stub shafts present at the ends thereof, the support shaft ends or said stub shafts protruding from the roll or the elongated member and being mounted on a bearing block.

The present invention relates particularly to a deflection compensated zonewise controlled roll for use in various positions of a paper or board machine, such as a press section or a calender section, comprising a stationary support shaft mounted on frame structures through the intermediary of bearing blocks fitted with articulation bearings, and a shell mounted with bearings on the support shaft and rotating around the shaft and having a fixed position relative to the support shaft. The shaft is provided with hydraulic loading elements which are grouped in zones of one or more loading elements. A nip force is transmitted through the shell to the loading elements, and further to frame structures by way of the support shaft. The nip force distribution can be modified by adjusting the oil pressure applied to the loading elements of each zone. This type of deflection compensated roll is used with a counter roll to establish a nip, the loading of which is accomplished for example by loading the counter roll by means of separate hydraulic cylinders towards the relevant deflection compensated roll or e.g. by lifting the deflection compensated roll from its bearing blocks against the counter roll. Shifting the nip load onto the support shaft of a roll results in a deflection of the shaft and, hence, in a tilting of its ends, the compensation of which is effected by means of an articulation bearing present in a bearing block. In addition, the articulation bearing assembly allows an axial movement for the support shaft, e.g. such as results from heat expansion.

BACKGROUND OF THE INVENTION

U.S. Pat. No. 3,802,044 to Spillmann et al., discloses pressure elements for a deflection compensated roll having a hollow cylindrical rotatable shell and a stationary shaft which extends through the shell and is supported at both its ends. The pressure elements are intended for maintaining the nip between the roll and a counter roll straight. The swivelling construction of the pressure element helps to maintain the element in the correct position against the shell, and to prevent its tilting with the roll shaft when the shaft bends under high pressure. The pressure elements of the Spillmann et al. patent do not load the roll against the counter roll, nor do they open or close the nip. This can be seen from the fact that the shell, which rotates around the stationary shaft, is mounted at both ends in bearings on the shaft. These bearings do not allow movement of the shell relative to the shaft, that is, the position of the shell relative to the counter roll can not be adjusted by means of the pressure elements. The pressure elements can only straighten the nip. The actual nip functions—closing, loading, opening—are carried out by means of external devices, which are not shown in the Spillmann et al. patent. An exemplary external device in a loading arm provided with a hydraulic cylinder, by means of which the roll with its shaft is moved towards the counter roll or away from it. This type of solution is bulky and requires that the pair of rolls is mounted on a separate frame.

In the present invention, the main object is to combine an articulation bearing with the loading of a roll against a counter roll. This is achieved by arranging a hydraulic element in a bearing block, by means of which element the roll is loaded against the counter roll. Due to its construction, the element allows deflection of the roll shaft. The solution of the present invention makes it possible to dispense with external loading elements, such as loading arms. Therefore, the solution entails substantial space saving as it is possible to bind together the pair of rolls through their bearing housings, that is, it is possible to obtain a pair of rolls without a separate frame structure.

OBJECTS AND SUMMARY OF THE INVENTION

It is one object of the present invention to provide an arrangement, whereby a deflection compensated roll or other elongated member, such as e.g. a doctor bar or a curved roll, can be loaded and fitted with articulation bearings in a relatively simple fashion. In order to accomplish this object, an arrangement of the invention is characterized in that the arrangement comprises at least one hydrostatically journalled or hydraulically relieving main loading element, which is mounted on a bearing block and works on the support shaft or stub shaft of a roll or other elongated member and which constitutes a loading element and, at the same time, an articulation bearing assembly for the discussed roll or other elongated member.

BRIEF DESCRIPTION OF THE DRAWINGS

The invention will now be described in more detail with reference to the accompanying drawings, in which:

FIG. 8 shows the embodiment of FIG. 6 in a schematic perspective view, with the bearing block omitted.

DETAILED DESCRIPTION OF THE INVENTION

Figure 1:
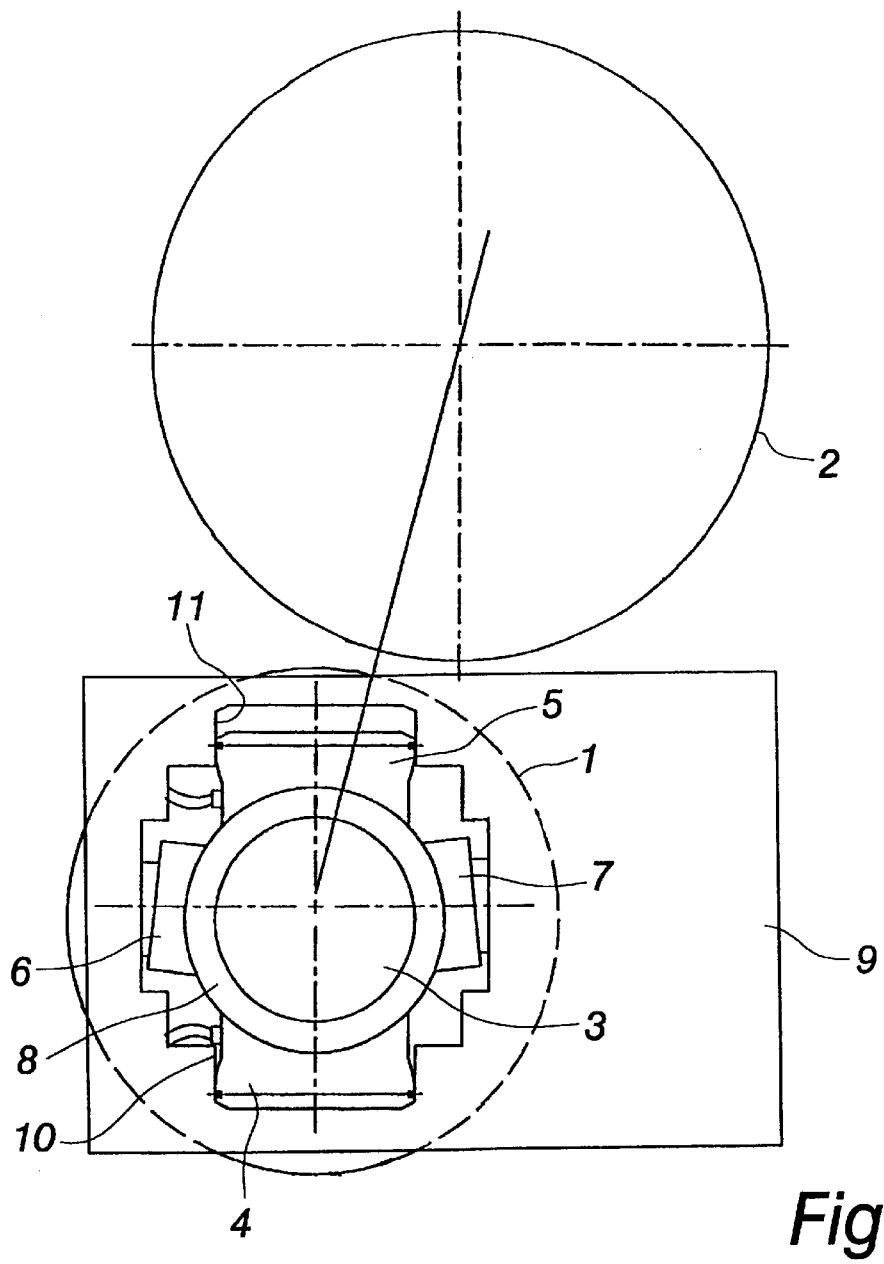
FIG. 1 shows one embodiment of the invention in a schematic plan view.
Figure 2:
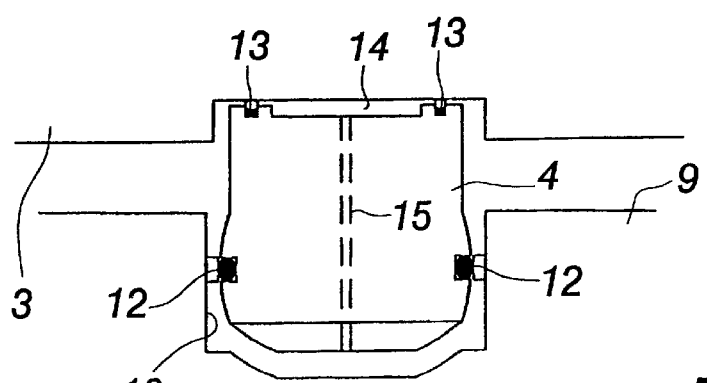
FIGS. 2–4 show in schematic side views a few optional implementations for one detail in the embodiment of FIG. 1.

As shown in FIGS. 1 and 2, a deflection compensated roll 1 is propped by means of its support shaft 3 on a bearing block 9 with the assistance of hydraulic loading elements 4, 5, 6 and 7. A counter roll is designated with reference numeral 2. The principal loading element comprises a piston 4, which is fitted in a cylinder chamber 10 supplied with a hydraulic fluid underneath the piston through hydraulic oil supply passages (not shown) for loading the piston 4 against the support shaft 3 and, thus, for loading the roll 1 against the counter roll 2. In addition, reference numeral 5 in FIG. 1 refers to a counter-load element which is movable in its own cylinder boring 11. A plane of loading defined by the piston 4 and the counter-load element 5 lies in an angular position relative to the direction of nip load. The lateral loads applied to the shaft 3 are handled by side loading shoes 6 and 7, which may pitch about the shaft 3 to afford the shaft 3 a vertical movement to a desired position. In the illustrated embodiment, the shaft 3 is surrounded by an extra sleeve 8 for an increased bearing diameter to allow the installation of a sufficiently large piston.

As shown in FIG. 2, the piston 4 can be designed as a closed piston, which is sealable for maintaining a pressure in the cylinder chamber 10 below the piston 4, even with an oil pump inoperative, whereby the roll can be kept in a high position. When the roll 1 is in the high position, the bottom piston 4 is preferably a closed piston. FIG. 2 illustrates a solution for reducing friction between the abutting surfaces of the support shaft 3 and the loading element 4. In this solution, the element 4 is provided with a through-going oil bore 15 for delivering hydraulic oil therefrom into an oil pocket 14, which is formed on the surface of the element 4 in abutment with the support shaft and around which is arranged sealing means 13. The piston 4 is able to pivot within the cylinder 10 according to angular variations of the shaft 3.

Figure 3:
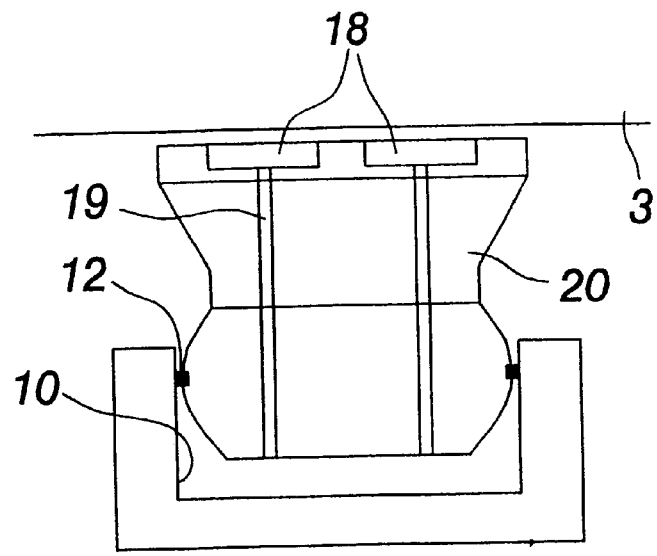

The side loading shoes 6, 7 include pistons which preferably operate on a flow-through principle. FIG. 3 illustrates a flow-through concept piston 20, wherein hydraulic oil is delivered from the cylinder chamber 10 through capillary bores 19 into lubricating oil pockets 18.

Figure 4:
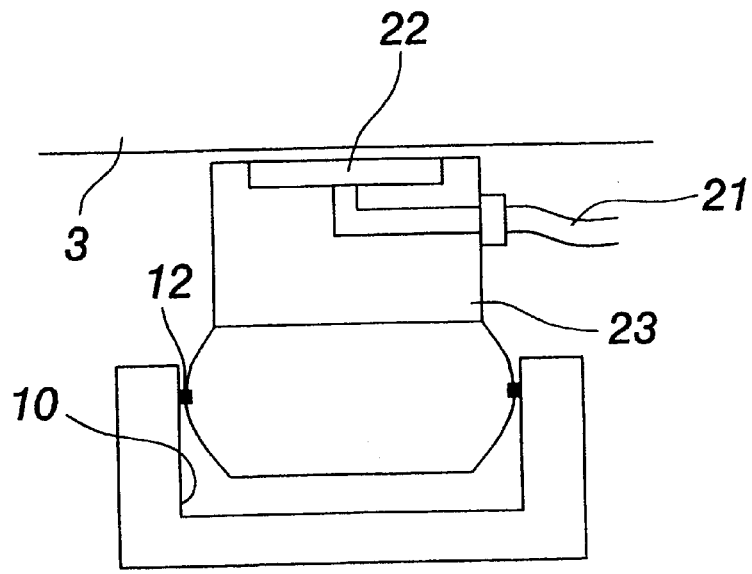

FIG. 4 in turn shows a closed piston 23, wherein an oil pocket 23 is supplied with lubricating oil in a separate feed through a tube or a hose 21.

In each of FIGS. 2 to 4, the cylindrical chamber 10 and the piston 4, flow-through concept piston 20 and the closed piston 23, respectively, are sealed with respect to one another by sealing means 12 arranged therebetween. The sealing means 12 allow for a pressure to be maintained within the cylinder chamber 10.

Figure 5:
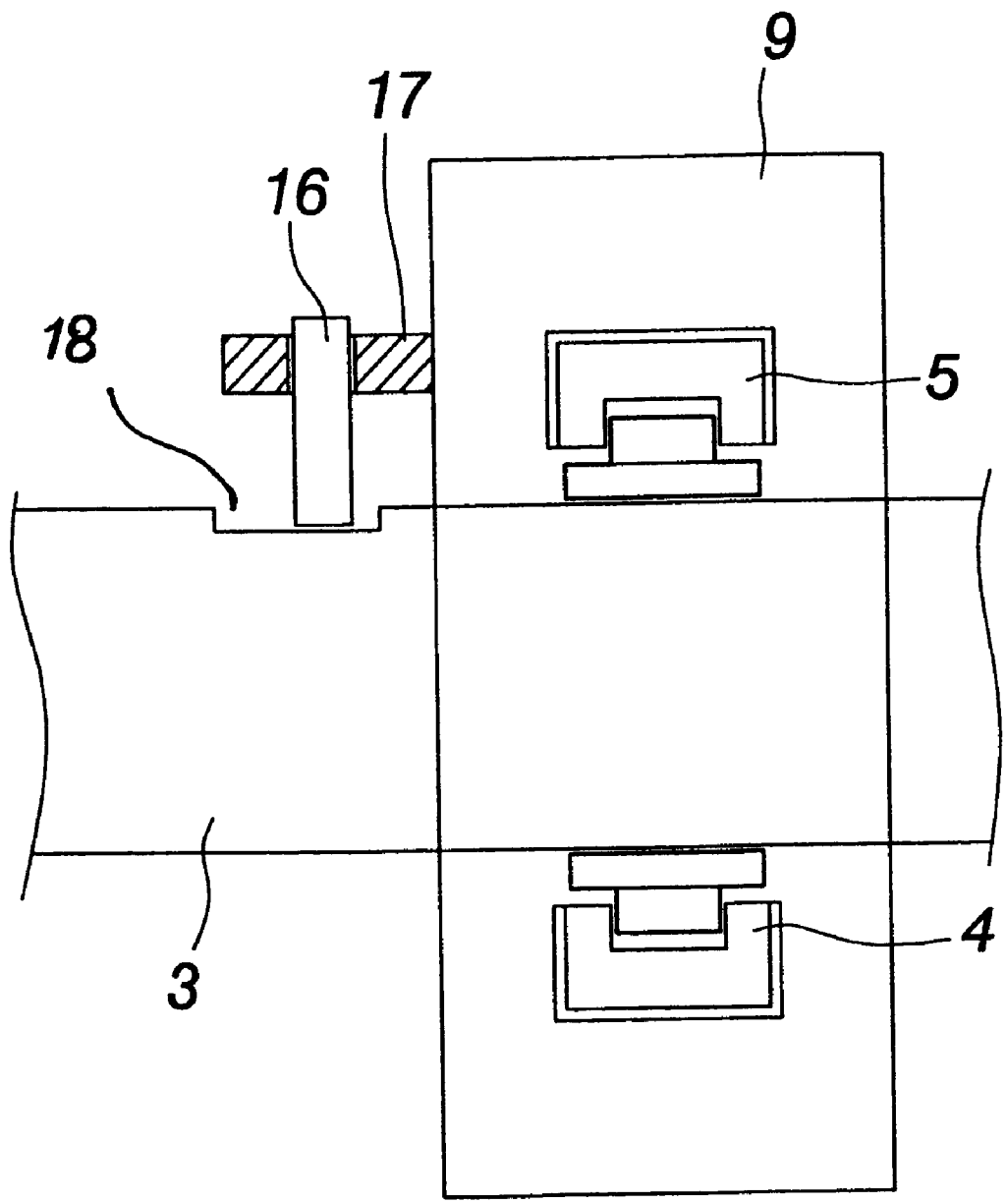
FIG. 5 shows a second embodiment of the invention in a schematic side view.

FIG. 5 illustrates an alternative embodiment, wherein lateral forces are taken up by means of a bar 16, which is attached by way of a bracket element 17 to a bearing block 9 and which is movable in a lengthwise groove 18 formed on the shaft 3, preventing the shaft from rotating due to lateral forces.

Figure 6:
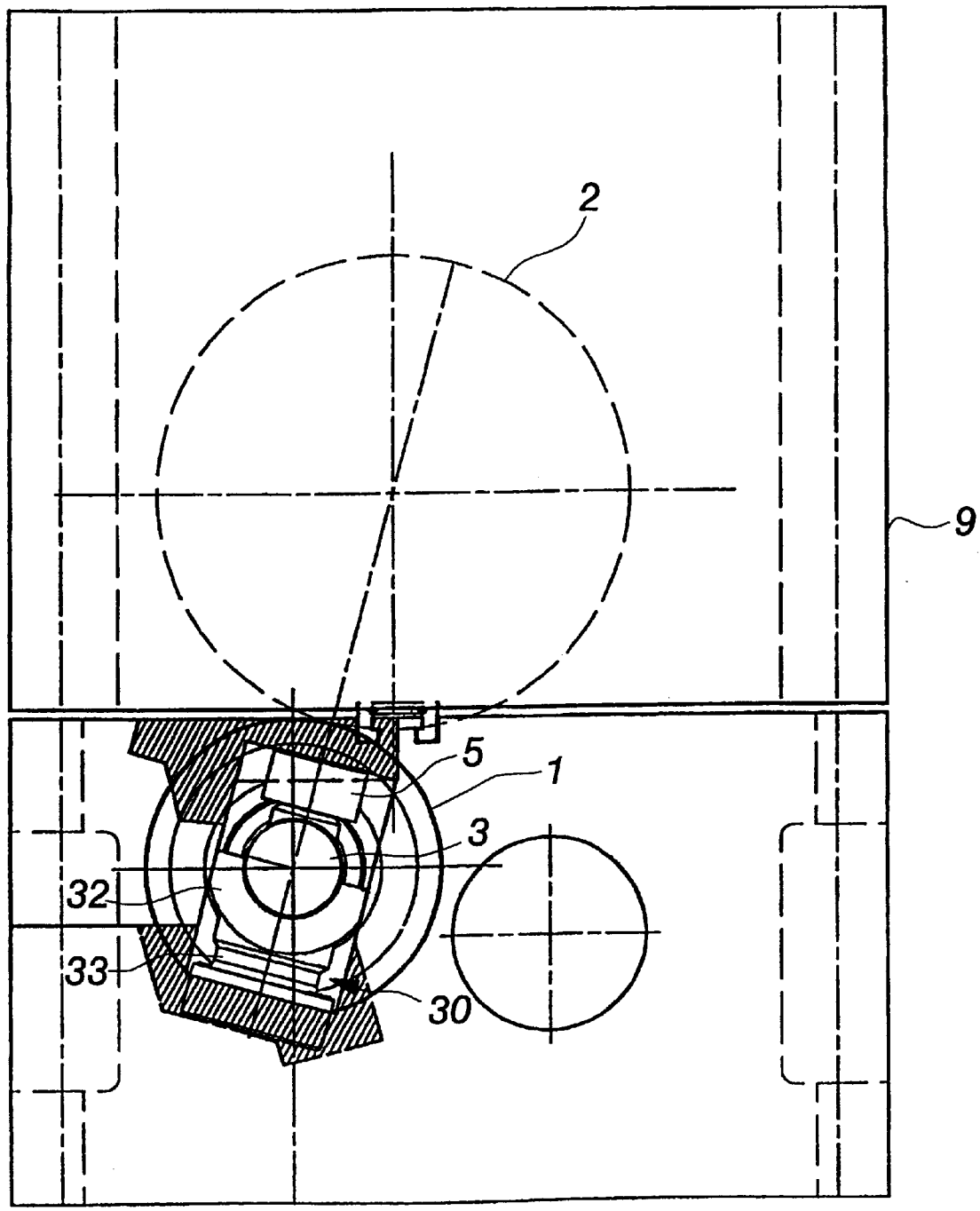
FIG. 6 shows yet another embodiment of the invention in a schematic plan view.
Figure 7:
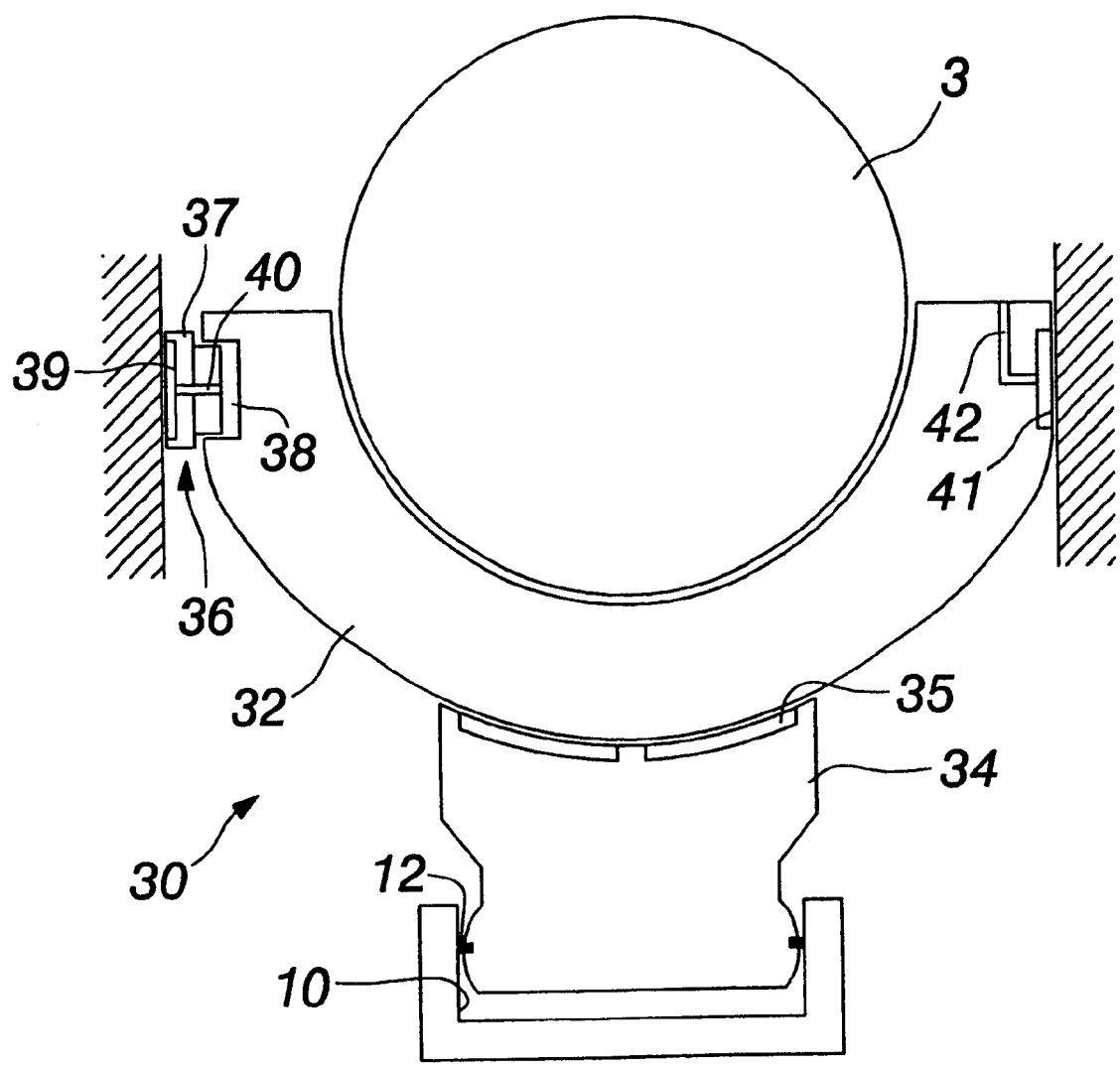
FIG. 7 shows a few details in the embodiment of FIG. 6.

FIGS. 6–8 show an arrangement of the invention in yet another embodiment, wherein the roll 1 is depicted in a bottom position, i.e. as a roll underneath the nip, and wherein the shaft 3 is turned in such a way that a main loading element 30 works essentially in the direction of nip load. In this embodiment, the main loading element 30 consists of a piston unit 33 and an extra sleeve member 32, fitted between the latter and the shaft 3, extending partly around the shaft 3, and joined with the shaft 3 for an integral assembly. The piston unit 33 comprises a piston 34, set in a cylinder boring 10 and having oil pockets 35 in its top surface provided with a supply of lubricating oil, e.g. as shown in any, of FIGS. 2–4. The piston 34 has a top surface (the surface facing the extra sleeve member 32) which is about 5% larger in area than its bottom surface (the surface within the cylinder chamber 10) for providing a lubricating film between the piston and the extra sleeve member. FIG. 7 illustrates take-up elements for lateral loads, comprising a hydrostatic side loading element 36 on one side and an oil pocket 41 on the opposite side. The oil pocket 41 is supplied through a passage 42 with hydraulic oil at a constant flow rate or at a constant pressure. The side loading element 36 comprises a piston 37, fitted in a cylinder boring 38 and having in its outer surface an oil pocket 39 which is supplied with hydraulic oil from the cylinder chamber or boring 38 through a capillary bore 40. The piston 37 is capable of travelling and pitching within the boring 38 to allow more tolerances in terms of range and perpendicularity.

With the roll 1 in a high position, i.e. as a roll above the nip, the piston unit 33 and the extra sleeve member 32 are on the side of the shaft 3 away from the nip, and the counter-load element 5 present on the side of the shaft 3 close to the nip is preferably designed as a closed piston.

The invention has been described above in connection with a deflection compensated roll, but it is also applicable e.g. in connection with curved rolls, which may be provided at each axial end with a stub shaft coupled with a bush-like element which is in turn mounted inside a roll shell within the end zone of the roll shell, the roll being loaded through the action of said stub shafts and bush-like elements. The invention is also conceivably applicable e.g. in connection with doctor bars provided with stub shafts at the ends thereof.

What is claimed is:

1. An arrangement for loading a deflection compensated roll or other elongated member in a paper/board or finishing machine and for providing an articulation bearing assembly, comprising:

a roll or elongated member being provided with a stationary support shaft extending axially of the roll or the elongated member or with stub shafts present at the ends thereof, the support shaft ends or said stub shafts protruding from the roll or the elongated member and being mounted on a bearing block;

at least one hydrostatically journalled or hydraulically relieving main loading element, which is mounted on the bearing block and works on the support shaft or said stub shafts of the roll or other elongated member, wherein said at least one hydrostatically journalled or hydraulically relieving main loading element constitutes a loading element and an articulation bearing assembly for the roll or other elongated member; and means for shutting off a supply of hydraulic oil to the main loading element, such that the main loading element remains under pressure.

2. An arrangement as set forth in claim 1, wherein said main loading element comprises:

a hydraulically loaded piston, which is fitted in a cylinder chamber formed in the bearing block and which piston is capable of pitching within the cylinder chamber allowing a lengthwise angular variation for the shaft.

3. An arrangement as set forth in claim 2, wherein the main loading element further comprises:

an extra sleeve member, fitted between the shaft and the piston, partially circumscribing the shaft, and joined as an integral assembly with the piston.

4. An arrangement as set forth in claim 3, further comprising take-up elements for lateral forces including:

a hydrostatic side loading element mounted on the extra sleeve member, and an oil pocket arranged on the side of the shaft away therefrom and provided with a supply of hydraulic oil at a constant flow rate or at a constant pressure.

5. An arrangement as set forth in claim 1, wherein the arrangement further comprises:

a hydrostatic counter-load element working on a side of the shaft opposite said main loading element.

6. An arrangement as set forth in claim 1, wherein said main loading element is adapted to be movable in a direction of loading to allow a setting of the shaft in desired position.

7. An arrangement as set forth in claim 1, wherein the arrangement further comprises:

take-up elements for taking-up forces acting in a plane lateral to a plane of loading defined by the main loading element, to prevent rotation of the shaft.

8. An arrangement as set forth in claim 7, wherein the take-up elements for lateral forces include hydrostatic side loading elements.

9. An arrangement as set forth in claim 7, wherein the take-up elements for lateral forces include linear guides, along which the shaft is movable in a direction of loading.

10. An arrangement as set forth in claim 7, wherein the take-up elements for lateral forces include:

a hydrostatic side loading element mounted on an extra sleeve member, and an oil pocket arranged on the side of the shaft away therefrom and provided with a supply of hydraulic oil at a constant flow rate or at a constant pressure.

11. An arrangement as set forth in claim 7, wherein the take-up elements for lateral forces include:

an axially extending groove formed on the shaft and a bar member having its end adapted to travel in said groove.

12. An arrangement as set forth in claim 1, wherein the elongated member comprises a curved roll.

13. An arrangement as set forth in claim 1, wherein the elongated member comprises a doctor bar.

14. An arrangement for loading a deflection compensated roll or other elongated member in a paper/board or finishing machine and for providing an articulation bearing assembly, comprising:

a bearing block;

a roll or elongated member having a stationary support shaft extending axially from the ends of said roll or said elongated member or having stub shafts structured and arranged on said ends of said roll or said elongated member, wherein said support shaft ends or said stub shafts protrude from said roll or said elongated member and are mounted on said bearing block;

at least one of a hydrostatically journalled and a hydraulically relieving main loading element, said main loading element being mounted on said bearing block and structured and arranged to affect said support shaft or said stub shafts of said roll or elongated member constituting a loading element; and an articulation bearing assembly structured and arranged in connection with said roll or said elongated member in order to compensate for an axial movement of said support shaft for the discussed roll or other elongated member.

\* \* \* \* \*